Oct. 25, 1966  S. GRZYMISLAWSKI  3,280,677
APPARATUS FOR CUTTING SHEET GLASS
Filed Oct. 13, 1965  3 Sheets-Sheet 1
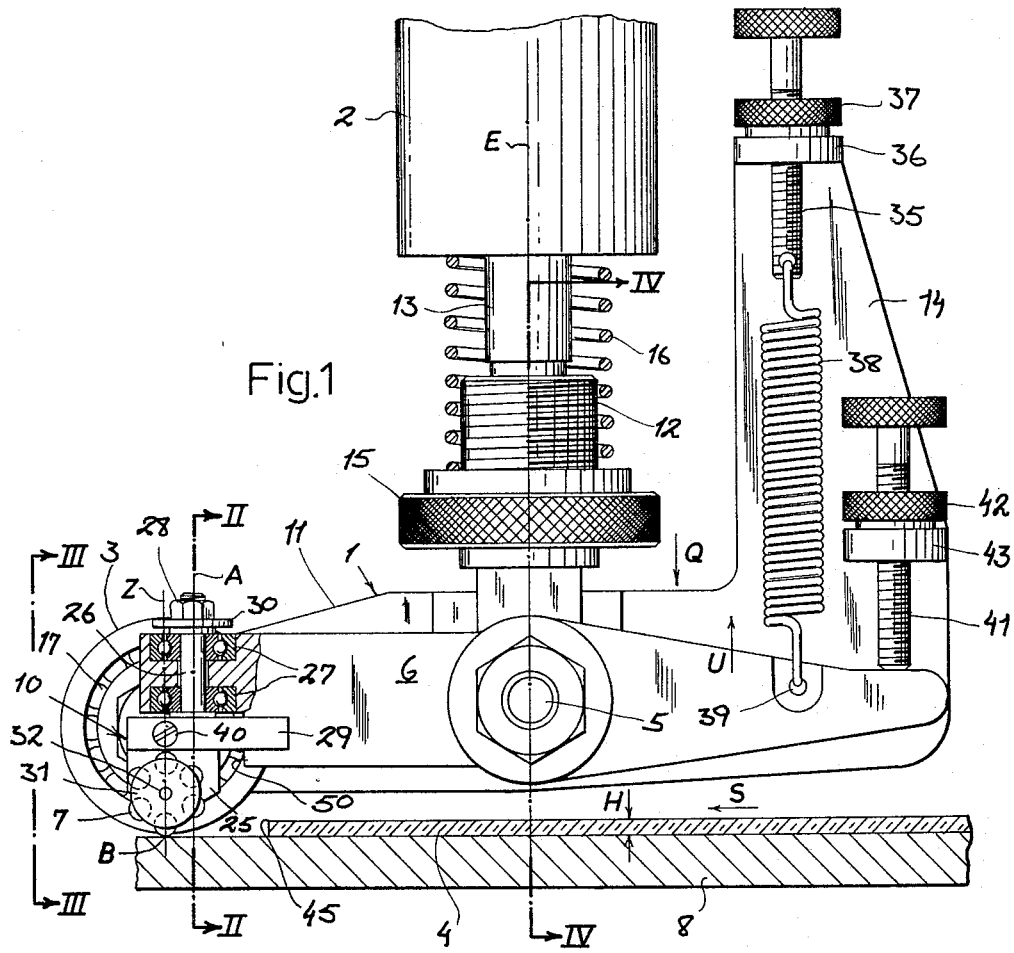
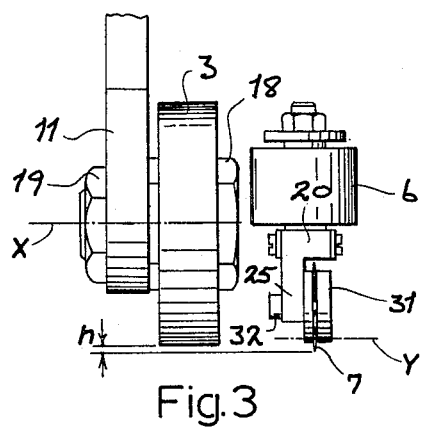
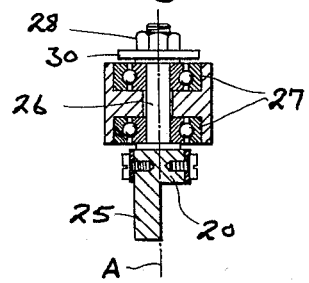
Stanislas Grzymislawsky
INVENTOR.
BY
Karl G. Ross
Attorney

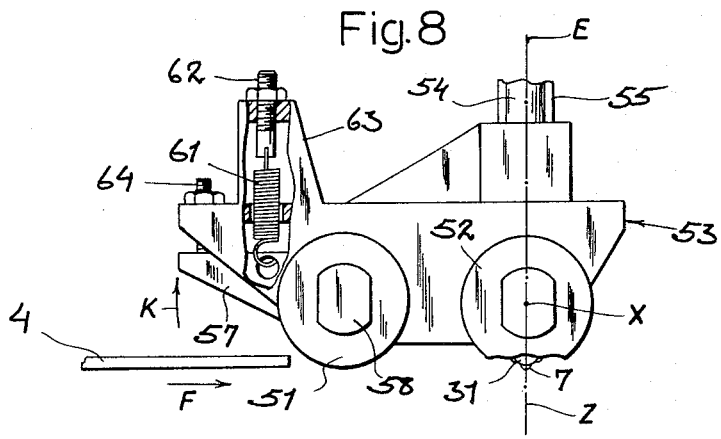
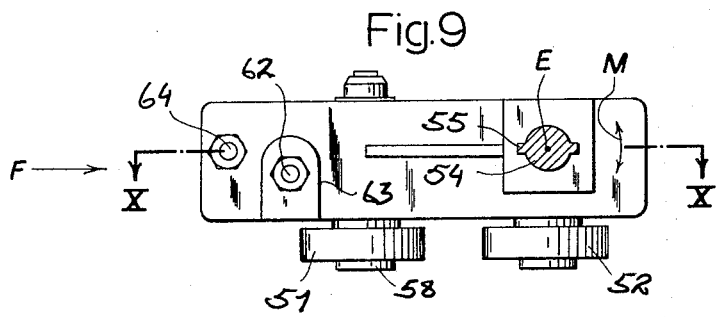
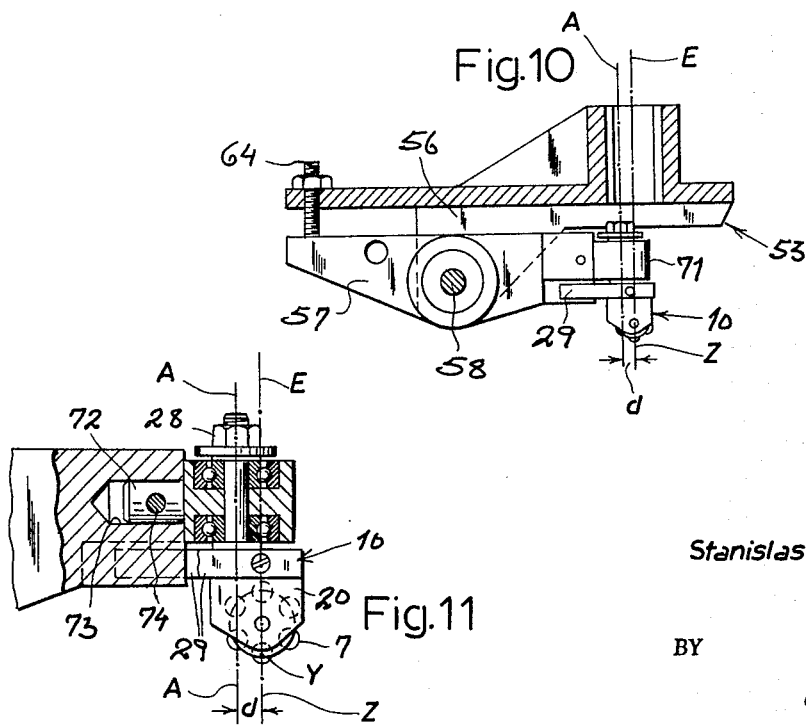

Oct. 25, 1966  S. GRZYMISLAWSKI  3,280,677
APPARATUS FOR CUTTING SHEET GLASS
Filed Oct. 13, 1965  3 Sheets-Sheet 3

Stanislas Grzymislawsky
INVENTOR.

BY Karl F. Ross
Attorney

United States Patent Office 3,280,677
Patented Oct. 25, 1966

3,280,677
APPARATUS FOR CUTTING SHEET GLASS
Stanislas Grzymisławski, Aniche, Nord, France, assignor to Glaces de Boussois, Paris, France., a corporation of France
Filed Oct. 13, 1965, Ser. No. 495,441
20 Claims. (Cl. 83—8)

This application is a continuation-in-part of my copending application Ser. No. 474,299, filed July 23, 1965.

My present invention relates to an apparatus for cutting sheets of glass or similar material.

For the cutting of glass sheets and the like it is customary to employ a knurled wheel, or rowel, urged under pressure against the sheet surface so as to penetrate it to a fraction of its thickness. When this is done automatically, i.e. when the cutting implement is mounted on a holder suspended above the sheet for horizontal motion relative thereto while being urged downwardly toward the sheet by a weight, a spring or some other biasing force, irregularities in the sheet surface will lead to changes in the depth of penetration so that upwardly curved sheet portions will be cut more deeply than flat or depressed portions. Since a clean fracture requires that the glass be scored uniformly to a predetermined depth, e.g. of several tenths of a millimeter, the invention has as one of its objects the provision of means for avoiding this kind of irregularity.

Cutting implements of the type described are usually made of tungsten carbide or similar refractory, relatively brittle materials. If the rowel initially rests on the sheet-supporting surface, it must be lifted therefrom by the oncoming sheet edge and, for this purpose, must have a radius greater than the thickness of the sheet. Even so, the impact between the sheet edge and the rowel may blunt or nick the latter so that its cutting action is impaired. A further object of my invention, therefore, is to provide means for minimizing this impact and, at the same time, permitting the use of smaller rowels whose radius is independent of the sheet thickness.

A more specific object of my invention is to provide means for automatically insuring perfect alignment of the glass-scoring lower edge of the cutting implement (e.g. the peripheral region of the rowel around its nadir) and the direction of relative motion between the implement and the sheet since, in practice, even a small angular offset (say, of 1°) detrimentally affects the character of the cut; this is particularly true in the case of high-speed cutting operations, carried out with rowels rotating at a rate on the order of 4000 r.p.m. and advancing across the sheet at a linear speed of about 150 cm. per second.

In my above-identified copending application I have disclosed a sheet-cutting apparatus comprising a two-part holder for the cutting implement, this holder being constituted by a spring-loaded or otherwise downwardly biased shoe and a swingable arm pivotally secured thereto. The shoe, guided with freedom of generally vertical displacement in a support which is generally horizontally displaceable with reference to the sheet to be cut, carries a sheet-contacting roller adjacent an extremity of the swingable arm on which the cutting implement is mounted so as to project downwardly beyond the nadir of the roller to the desired depth of penetration; a yieldable linkage so interconnects the shoe and the arm that the cutting implement is normally maintained at its predetermined level below the roller while being able to move upwardly, with reference to the roller, upon encountering, say, a localized rise in the sheet surface. Such a yieldable linkage includes, advantageously, one or more springs tending to swing the aforementioned extremity downwardly and an adjustable stop limiting this downward swing. The roller, whose radius substantially exceeds the sheet thickness, is cammed upwardly by the oncoming leading edge of the sheet and thereby raises the cutting implement to its proper operating level before the implement contacts the sheet. The support for the implement holder may be either stationary or movable, since, of course, the relative displacement between the implement and the sheet may be brought about by motion of either one or the other, or both. In any event, there will exist two substantially parallel, generally horizontal axes transverse to the direction of this relative displacement, i.e. a first axis about which the arms swing on the shoe and a second axis about which the roller is rotatable. The cutting implement, if designed as a rowel, turns about a third axis which preferably is vertically aligned with the aforementioned second axis so that rowel and roller share a common vertical radial plane.

In some instances, as also disclosed in my copending application, it is desirable to provide on the shoe a second roller rotatable about an axis horizontally offset from that of the first roller, specifically at a location forwardly of the first roller as viewed from the direction of the oncoming sheet. This second roller, whose diameter may be about equal to that of the first roller and should also be substantially greater than that of the cutting rowel, then makes the first contact with the sheet to be cut and, by the aforedescribed camming action, raises the trailing cutting implement off the supporting surface; with this arrangement, therefore, the implement holder can be freely moved across that surface once the leading roller has engaged the sheet. This leading roller may be slightly raised above the trailing roller alongside the cutting implement, by a distance which should be less than the sheet thickness and may equal about half that thickness so that the camming displacement of the implement is more or less equally distributed between the two rollers.

In accordance with the present improvement, the rowel or other cutting implement is swivelably mounted on its support, specifically on an extremity of the swingable arm, so as to be at least limitedly rotatable about a substantially vertical axis located forwardly of its scoring edge (as viewed in the direction of implement motion relative to the sheet) whereby this edge trails the vertical swing axis of its mounting and, in response to the frictional drag created by the relative movement, is automatically oriented in the direction of motion. The vertical swing axis may have a fixed location with reference to the scoring edge but, in accordance with a specific embodiment, means may also be provided for enabling the implement to be entrained by the drag into an off-normal position offset from that swing axis whereby the system will work equally well upon a reversal of the relative motion between the cutter and the glass sheet. Springs or equivalent biasing means are advantageously provided in any case to tend to maintain the scoring edge in at least approximate alignment with a vertical plane extending in the direction of motion, this plane including the swing axis.

The above and other features of my invention will become more fully apparent from the following detailed description of certain embodiments, reference being made to the accompanying drawing in which:

FIG. 1 is a side-elevational view of an apparatus embodying the invention;

FIG. 2 is a fragmentary sectional view taken on the line II—II of FIG. 1;

FIG. 3 is a fragmentary end view taken on the line III—III of FIG. 1;

FIG. 8 is another side-elevational view (parts broken away) similar to FIG. 1, illustrating a further modification;

FIG. 9 is top plane view of the apparatus shown in FIG. 8;

FIG. 10 is a cross-sectional view taken on the line X—X of FIG. 9;

FIG. 11 is a fragmentary side view showing, in section, and on an enlarged scale, part of the assembly illustrated in FIG. 10;

Figure 4:
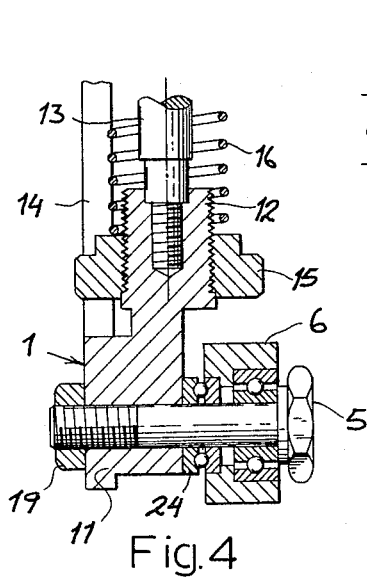
FIG. 4 is a fragmentary sectional view taken on the line IV—IV of FIG. 1.

Reference will first be made to the embodiment of FIGS. 1–4 comprising a shoe 1 mounted, with freedom of at least limited vertical displacement, on an overhead support 2 which may be a part of a horizontally movable carriage or may be fixed to the machine frame, the latter also including a table 8 supporting a glass sheet 4 to be cut.

Shoe 1 forms part of an implement holder which further comprises a swingable arm 6 pivotally mounted on a horizontal leg 11 of the shoe by means of a bolt 5 fastened to this leg with the aid of a nut 21. The left-hand extremity (as viewed of FIG. 1) of leg 11 has journaled thereon a roller 3 of a radius substantially greater than the thickness of sheet 4. This roller constitutes the outer race of a ball bearing 17 whose inner race is rigid with a mounting bolt 18 fastened to the leg 11 by a nut 19.

Alongside roller 3, on a corresponding extremity of arm 6, a block 20 rigid with an upstanding stem 26 is introduced from below into a complementary recess of the arm and is engaged by a nut 28 with interposition of one or more washers 30 between this nut and the inner races of a pair of ball bearings 27 by which the stem 26 is swivelably mounted in the rear extremity of arm 6 so that the block 20 is rotatable about the vertical axis A of that stem. A pair of leaf springs 29, fastened to an off-axial portion of block 20 by screws 40, straddle the rear edge 50 of arm 6 so as to tend to maintain a predetermined position of alignment between the arm 6 and a swivelable cutter mount 10 of which the block 20 with its stem 26 forms a part.

Figure 5:
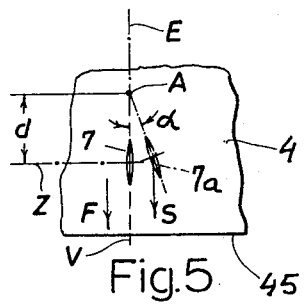
FIGS. 5 and 6 are schematic plan and side views, respectively, serving as explanatory diagrams.

A lug 25 projects downwardly from the block 20 and is traversed by a mounting bolt 32 engaging a rotatable disk 31 which in turn carries an array of small cutter wheels or rowels 7, the lowermost one of these rowels projecting downwardly below the nadir of roller 3 by a distance h (see FIG. 3) equaling a small fraction of the thickness H of sheet 4. It will be noted that each rowel 7 has a diameter which is considerably smaller than that of the roller 3 and, in the arrangement illustrated, is roughly equal to the sheet thickness H. Upon a loosening of bolt 32, any one of the several rowels 7 may be operatively positioned in line with the nadir C of roller 3; in this operative position, the lowest point B of the rowel lies in the vertical radial plane Z thereof which also radially passes through the nadir C of the roller. The horizontal axes of rotation X of the roller and Y of the rowel lie in this plane Z which is rearwardly offset from the swing axis A by a distance d (FIG. 5).

The connection between shoe 1 and support 2 includes an internally and externally threaded socket 12, rigid with leg 11, which has screwed into it an upstanding stem 13 slidably received in a vertical bore of support 2. An expanding coil spring 16 partly surrounds the stem 13 and bears upon the support 2 as well as upon a milled nut 15 engaging the threaded outer surface of socket 12. Thus, spring 16 urges the shoe 1 downwardly as indicated by the arrow Q in FIG. 1.

The extremity of shoe 1 opposite the one bearing the roller 3 is formed as an upstanding leg 14 with a transverse shelf 36 into which a bolt 35 is threaded, this bolt being fixed in position by a milled counternut 37. Another contractile coil spring 38 is anchored to the lower end of bolt 35 and engages the arm 6 at 39, thereby tending to swing this arm counterclockwise (FIG. 1) as indicated by arrow U. The extent of this swinging motion is limited by a bolt 41 threadedly engaging another transverse shelf 43 of leg 14 and locked in position by a milled counternut 42, the lower end of this bolt bearing upon the free front end of arm 6 opposite the extremity which carries the mount 10 for the array of cutting implements 7. It will be apparent that adjustment of bolt 41 permits a change in the level of the rowel disk 31 with reference to roller 3 and, thereby, a variation of the distance h which, usually, has a value of a few tenths of a millimeter.

To facilitate the swinging of the arm 6 relative to shoe 1, a ball-type thrust bearing 24 (FIG. 4) in interposed between this arm and the leg 11.

In the description of the operation of the apparatus of FIGS. 1–4 it will be assumed that support 2 is stationary and that the sheet 4 is being slid, in the direction of arrow F, across the table 8 toward the cutting assembly 3, 7 which initially rests fixedly on the table under the urging of biasing spring 16.

As the sheet 4 approaches the roller 3, its leading edge 45 (FIG. 6) engages the roller periphery so as to cam the assembly 3, 7 upwardly (arrow J) until the nadir C of the roller lies almost at the level of the upper sheet surface. At this instant, the rowel 7 begins to cut into the sheet whose edge 45 strikes the rowel at a rather small angle (with reference to a line tangent to the periphery of the rowel at the point of contact) so as to avoid any damage to the implement. Since the roller 3 will follow any rise and fall of the sheet surface, the rowel 7 will be entrained so as to maintain a constant depth of penetration equal to the distance h.

Naturally, rowel 7 may yield upwardly against the restraining force of the resilient link 38, suitably adjusted by the bolt 35, if any obstacle should present itself in its path.

The relative displacement between the cutting apparatus and the sheet 4, as represented by the arrow F, gives rise to a frictional drag exerting upon the glass-scoring lower edge of rowel 7 a directive force S (FIG. 5) parallel to F. If, as indicated in FIG. 5, rowel 7 is not precisely aligned with the direction of motion F but has been swung out by an angle $\alpha$ into a position 7a, force F will have a component $S \cdot \sin\alpha \cdot \cos\alpha$ tending to restore the rowel to its position of alignment. Since this restoring force is practically unopposed, the rowel 7 during operation will always be automatically positioned within a vertical plane V which includes the swing axis A and, advantageously, also the centerline E of the vertically slidable stem 13 so that this stem is not subject to any torsional stress.

Figure 7:
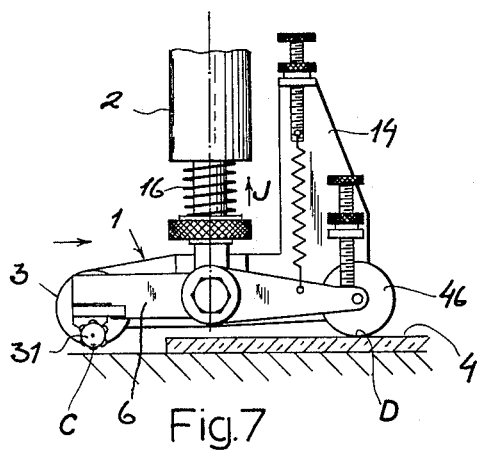
FIG. 7 is a side-elevational view similar to FIG. 1, showing a modification.

As illustrated in FIG. 7, a second roller 46 may be journaled on arm 6 forwardly of the roller 3, thus at a location closer to the oncoming sheet 4, the nadir D of this roller 46 being advantageously raised above nadir C of roller 3 with a difference in height somewhat greater than h but substantially less than H, e.g. equal to H/2. With this arrangement, the oncoming sheet edge 45 will first meet the roller 46 and cam the implement holder 1, 6 upwardly by a distance H/2, this action being followed by a like camming action upon the subsequent encounter between edge 45 and roller 3. With this arrangement it is also possible to start the operation by lowering the holder 1, 6 into the position illustrated in FIG. 7, in which the roller 46 already rests on the sheet 4, and thereafter to displace the support 2 with the holder in the direction opposite that of arrow F, as indicated by arrow G in FIG. 7, to bring the cutting assembly 3, 7 into engagement with the sheet; this is true because the roller 46, in riding on the sheet 4, lifts the lowermost rowel 7 of the table 8 so that the undesirable contact between the rowel and the table would take place during such motion.

In FIGS. 8–11 I have shown part of a modified apparatus whose implement holder again consists essentially of two relatively movable members, i.e., a shoe 53 and a swingable arm 57 pivotally secured to a horizontal leg 56 of the shoe by a bolt 58. The yieldable linkage interconnecting the two members is here represented by a contractile spring 61 anchored via a bolt 62 to a bracket 63 of shoe 53 and also attached to the left-hand extremity of arm 57 which is urged by the spring (in a clockwise direction indicated in FIG. 8 by arrow K) against an adjustable stop screw 64. The other end of shoe 53 is formed with an upstanding stem 54 slidably received, as before, in an overhead support not illustrated and weighted down by a suitable biasing force; stem 54 is formed with ribs 55 preventing relative rotation between the holder 53, 57 and its support, this holder being thus bodily swingable about the vertical stroke axis E (here the centerline of stem 54) by rotation of the support and the stem in a horizontal plane as indicated by the arrow M in FIG. 9. Axis E passes through the cutting point of an implement 7 which may be similar to the bottom rowel so designated in FIGS. 1 and 3, this axis E being thus included in the aforedescribed common radial plane Z of the rowel and of its associated guide roller 52. Another guide roller 51 is journaled on the bolt 58 so as to be rotatable about the swing axis of arm 57; this leading roller 51 is again slightly elevated, e.g., by about half the thickness of sheet 4, above the trailing roller 52 so that the assembly 53, 57 is again cammed upwardly in two stages as the sheet 4 is moved toward the implement 59 as indicated by arrow F in FIGS. 8 and 9.

Figure 6:
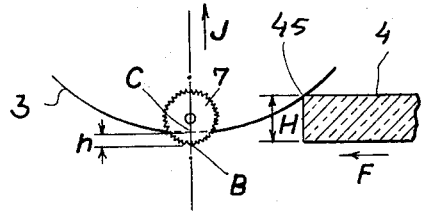

The leg 56 of shoe 53 is of inverted-U profile and accommodates the implement 7 and its swivelable mount 10 between the arms of the U in line with vertical axis E, this arrangement facilitating changes in the direction of cut by a swinging of the implement holder about the axis E (arrow M). Thus, the apparatus of FIGS. 6–8 is capable of tracing not only rectilinear but also arcuate or wavy lines.

As best illustrated in FIG. 11, the ball bearings 27 rotatably supporting the stem 26 are here lodged in a boss 71 forming a rearward extension of swingable arm 57. Boss 71 has a forwardly projecting stud 72 fixed by a cotter pin 74 in a bore 73 of the arm 57 which is straddled by the centering springs 29. As in the preceding embodiment, swing axis A of stem 26 is offset by a distance $d$ from the vertical radial plane Z which contains the axes of rotation X, Y and which in the present instance also includes the centerline E.

Figure 12:
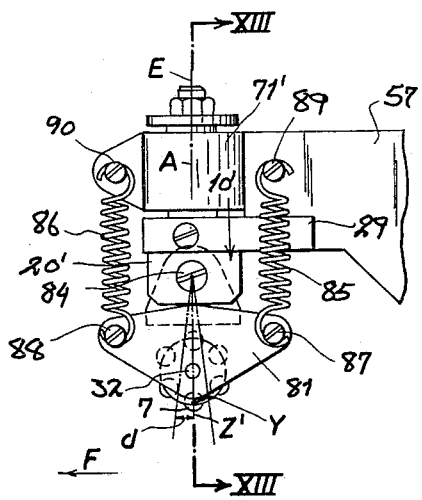
FIG. 12 is a fragmentary side-elevational view of a modified version of the structure shown at lower left in FIG. 1.
Figure 13:
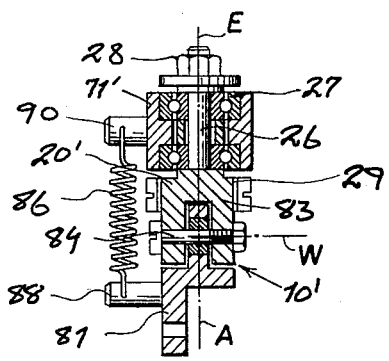
FIG. 13 is a cross-sectional view taken on the line XIII—XIII of FIG. 12.

Finally, I have illustrated in FIGS. 12 and 13 an embodiment comprising a modified mount 10' replacing the mount 10 at the trailing end of swingable arm 57. The block 20' of this mount, rotatably supported by its stem 26 and bearings 27 in a boss 71', has a bifurcate lower end in which a carrier 81 for the rowel disk 31 is swingably secured by a bolt 84 for rotation about a horizontal axis W parallel to the axes X and Y. Carrier 81 is generally triangularly shaped and is biased by a pair of counteracting springs 85, 86 into a normal position in which its radial plane Z', including the axes Y and W along with the axis of bolt 32, is vertical so as also to include the roller axis X (not shown in FIGS. 12 and 13) as well as the swing axis A which here coincides with the support axis E. Springs 85 and 86 are anchored to block 71' at 89, 90 and to carrier 81 at 87, 88, respectively.

When the sheet engaged by the rowel 7 moves to the left in FIG. 12 as indicated by the arrow F, the rowel and its carrier 81 are frictionally entrained so that the carrier swings about its axis into a position in which the nadir of the rowel is spaced from the swing axis A by a distance $d$; if the direction of sheet motion is reversed, the swing is in the opposite sense. In each case, therefore, the scoring edge of the rowel is rearwardly offset from the swing axis so as to give rise to a corrective force, as explained with reference to FIG. 5, in the event of a disalignment of the rowel with reference to the direction of motion.

The embodiment of FIGS. 12 and 13 thus facilitates not only the cutting of arcuate or wavy lines but also a directional change of 180° without any objectionable disalignment between the rowel and the vertical plane of advance.

The rowel 7 may have a diameter of approximately 75 mm. in which event a linear speed of 150 cm. per second will correspond to a rowel speed of about 4000 revolutions per minute.

Naturally, the particular structures described and illustrated may be modified without departing from the spirit and scope of my invention as defined in the appended claims.

I claim:
1. An apparatus for cutting sheet glass, comprising a support mounted for generally horizontal motion relative to a sheet to be cut, with freedom of limited vertical displacement; a sheet-contacting roller of a radius substantially exceeding the sheet thickness journaled to said support for rotation about a generally horizontal axis; a cutting implement formed with a glass-scoring lower edge; and swivelable mounting means for said implement securing same to said support with said lower edge in substantial alignment with the nadir of said roller but swingable about a substantially vertical axis located forwardly of said lower edge as viewed in the direction of said relative motion.

2. An apparatus as defined in claim 1 wherein said mounting means is provided with spring means engaging said support for tending to maintain said lower edge in a plane which includes said substantially vertical axis and extends in said direction of relative motion.

3. An apparatus as defined in claim 1 wherein said cutting implement is a rowel of a diameter substantially less than that of said roller.

4. An apparatus as defined in claim 3, further comprising a carrier for said rowel pivotally secured to said mounting means for swinging about a substantially horizontal pivotal axis parallel to the roller axis, said pivotal axis being disposed above said rowel whereby the latter can swing in response to the drag of said sheet to either side of a midposition in which said roller and said rowel share a common vertical plane, and biasing means tending to maintain said rowel in said midposition.

5. An apparatus as defined in claim 3, further comprising a carrier for said rowel pivotally secured to said mounting means for swinging about a substantially horizontal pivotal axis parallel to the roller axis, said pivotal axis being disposed above said rowel whereby the latter can swing in response to the drag of said sheet to either side of a midposition in which said roller and said rowel share a common vertical radial plane, and a pair of counteracting springs tending to maintain said rowel in said midposition.

6. An apparatus for cutting sheet glass, comprising a support mounted for generally horizontal motion relative to a sheet to be cut; a shoe depending from said support above the path of said sheet with freedom of relative displacement in a generally vertical direction; biasing means urging said shoe downwardly with reference to said support; an arm pivotally secured to said shoe for relative swinging about a generally horizontal first axis substantially transverse to the direction of said relative displacement; a sheet-contacting roller of a radius substantially exceeding the sheet thickness journaled to said shoe adjacent an extremity of said arm for rotation about a second axis substantially parallel to said first axis; a cutting implement formed with a glass-scoring lower edge; swivelable mounting means for said implement securing same to said extremity with said lower end in substantial alignment with the nadir of said roller but swingable about a substantially vertical axis located forwardly of said lower edge as viewed in the direction of said relative motion; and a yieldable link means interconnecting said arm and said shoe for tending to maintain said lower end of said implement at a predetermined level below the nadir of said roller.

7. An apparatus as defined in claim 6 wherein said yieldable link means includes an adjustable stop means limiting the downward swing of said extremity and swing means tending to maintain said arm in a limiting position defined by said stop means.

8. An apparatus as defined in claim 6 wherein said cutting implement is a rowel of a diameter substantially less than that of said roller sharing a common vertical radial plane with said roller, said plane including said second axis.

9. An apparatus as defined in claim 6 wherein said shoe is provided with an upstanding stem slidably guided in said support.

10. An apparatus as defined in claim 9 wherein said stem has a centerline substantially intersecting said first axis and passing through said lower edge, said arm and said shoe being provided with extensions beyond said stem interconnected by said link means at a location opposite said extremity.

11. An apparatus as defined in claim 6 wherein said shoe is mounted on said support for rotation about a generally vertical axis in line with said lower edge of said implement.

12. An apparatus as defined in claim 11 wherein said shoe is formed with an inverted-U profile straddling said arm and said mounting means.

13. An apparatus as defined in claim 6 wherein said mounting means is provided with spring means engaging said arm for tending to maintain said lower edge in a plane which includes said substantially vertical axis and extends in said direction of relative motion.

14. An apparatus for cutting sheet glass, comprising a support mounted for generally horizontal motion relative to a sheet to be cut; a shoe depending from said support above the path of said sheet with freedom of relative displacement in a generally vertical direction; biasing means urging said shoe downwardly with reference to said support; an arm pivotally secured to said shoe for relative swinging about a generally horizontal first axis substantially transverse to the direction of said relative displacement; a first sheet-contacting roller of a radius substantially exceeding the sheet thickness journaled to said shoe adjacent an extremity of said arm for rotation about a second axis substantially parallel to said first axis; a cutting implement formed with a glass-scoring lower edge; swivelable mounting means for said implement securing same to said extremity with said lower end in substantial alignment with the nadir of said roller but swingable about a substantially vertical axis located forwardly of said lower edge as viewed in the direction of said relative motion; a second sheet-contacting roller of a radius substantially exceeding the sheet thickness journaled to said shoe at a location offset from said cutting implement for rotation about an axis substantially parallel to said second axis; and yieldable link means interconnecting said arm and said shoe for tending to maintain said lower edge of said implement at a predetermined level below the nadir of said first roller.

15. An apparatus as defined in claim 14 wherein said second roller precedes said first roller, as viewed from the direction of the oncoming sheet, and is elevated above said first roller by a distance less than $H-h$ where H is the sheet thickness and $h$ is the difference between the levels of the lowest point of said implement and the nadir of said first roller, $h$ being substantially smaller than H.

16. An apparatus as defined in claim 15 wherein said distance is substantially equal to $H/2$.

17. An apparatus as defined in claim 15 wherein said rollers are disposed on opposite sides of said first axis.

18. An apparatus as defined in claim 15 wherein said second roller is rotatable about said first axis.

19. An apparatus as defined in claim 18 wherein said shoe is provided with an upstanding stem slidably guided in said support, said stem having a centerline intersecting said second axis and passing through said lower edge, said shoe being rotatable about said centerline.

20. An apparatus as defined in claim 14 wherein said cutting implement is a rowel of a diameter substantially less than those of said rollers sharing a common vertical radial plane with said first roller, said plane including said second axis.

No references cited.

WILLIAM W. DYER, JR., *Primary Examiner.*

J. M. MEISTER, *Assistant Examiner.*